C. E. WILLIAMS.
TIRE.
APPLICATION FILED OCT. 15, 1918.

1,343,861. Patented June 15, 1920.

Witness
CMBluem

Inventor
Charles E. Williams

By Victor J. Evans
Attorney

UNITED STATES PATENT OFFICE.

CHARLES E. WILLIAMS, OF PITTSBURGH, PENNSYLVANIA.

TIRE.

1,343,861. Specification of Letters Patent. Patented June 15, 1920.

Application filed October 15, 1918. Serial No. 258,168.

*To all whom it may concern:*

Be it known that I, CHARLES E. WILLIAMS, a citizen of the United States, residing at Pittsburgh, in the county of Allegheny and State of Pennsylvania, have invented new and useful Improvements in Tires, of which the following is a specification.

This invention relates to a tire and has for its primary object to simplify a construction of this character without sacrificing the efficiency thereof.

An object of the invention is to provide simple substantial resilient means capable of giving the proper resiliency to the tire but housed and protected against distortion.

Besides the above my invention is distinguished in the novel manner of forming the side members and associated with the tread member so that upon loosening relatively few bolts the parts may be quickly separated, the construction having the additional advantage that wear can be properly compensated for.

With these and other objects in view the invention will be better understood from the following detailed description taken in connection with the accompanying drawing wherein.

Figure 1:
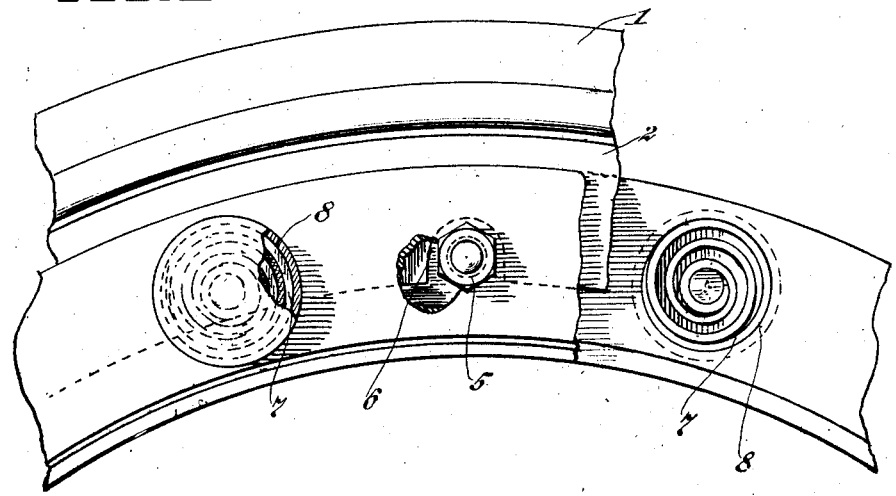
Figure 1 is a fragmentary side elevation of the tire.

My invention constructed in one of its forms as illustrated in the drawing consists of a tread member 1 of any suitable form or construction having an inwardly extending flange 2. This flange 2 is slidably received by the side members 3 and 4 which are detachably bound together by bolts 5, one of which is illustrated in the drawing. For the purpose of allowing proper sliding movement of the tread member 1 without interfering with the bolts 5, the former is cut away as illustrated at 6.

As far as I have proceeded it will be seen that by loosening the bolts 5, the parts may be readily disconnected and besides any wear caused by the sliding action between the flange 2 and side members 3 and 4, can be quickly taken care of by tightening the bolts 5.

Figure 2:
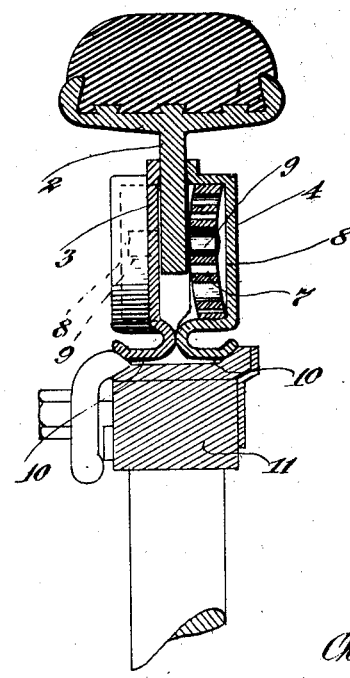
Fig. 2 is a cross sectional view.

Any suitable resilient device may be interposed between the tread member 1 and side members but for the purpose of illustration, I have shown coil springs 7 housed within pockets 8 formed in the side members. Each spring is frictionally held within the pocket and connected to a pin 9 projecting from the flange 2. Referring to Fig. 2 it will be seen that each spring 7 is bowed in a direction toward the flange 2 so that the same will be yieldably held in place in the pocket and rattling thereof prevented. Bowing the springs laterally as illustrated also provides a slight resilient opposition to the tendency of the flange 2 to move laterally; but when the side members are properly tightened with relation to flange 2, the latter will have very little play.

To complete the invention the side members are flanged as indicated at 10 so as to be connected to a wheel rim 11. From the foregoing description taken in connection with the accompanying drawing it should be apparent that I provide a tire of substantial construction having the required amount of resiliency and which may be manufactured at a relatively low cost. It is of course to be understood that the tire may be constructed in various other manners than illustrated without departing from the spirit of the invention and therefore I do not desire to be limited in any manner except as set forth in the claim hereunto appended.

Having described my invention, what I claim is:

A tire comprising a tread member having an annular flange, a pair of side members slidably receiving said flange, pins projecting from said flange, and coil springs each mounted in a pocket formed in the side member and bowed in a direction toward the flange and connected thereto.

In testimony whereof I affix my signature.

CHARLES E. WILLIAMS.